128,841

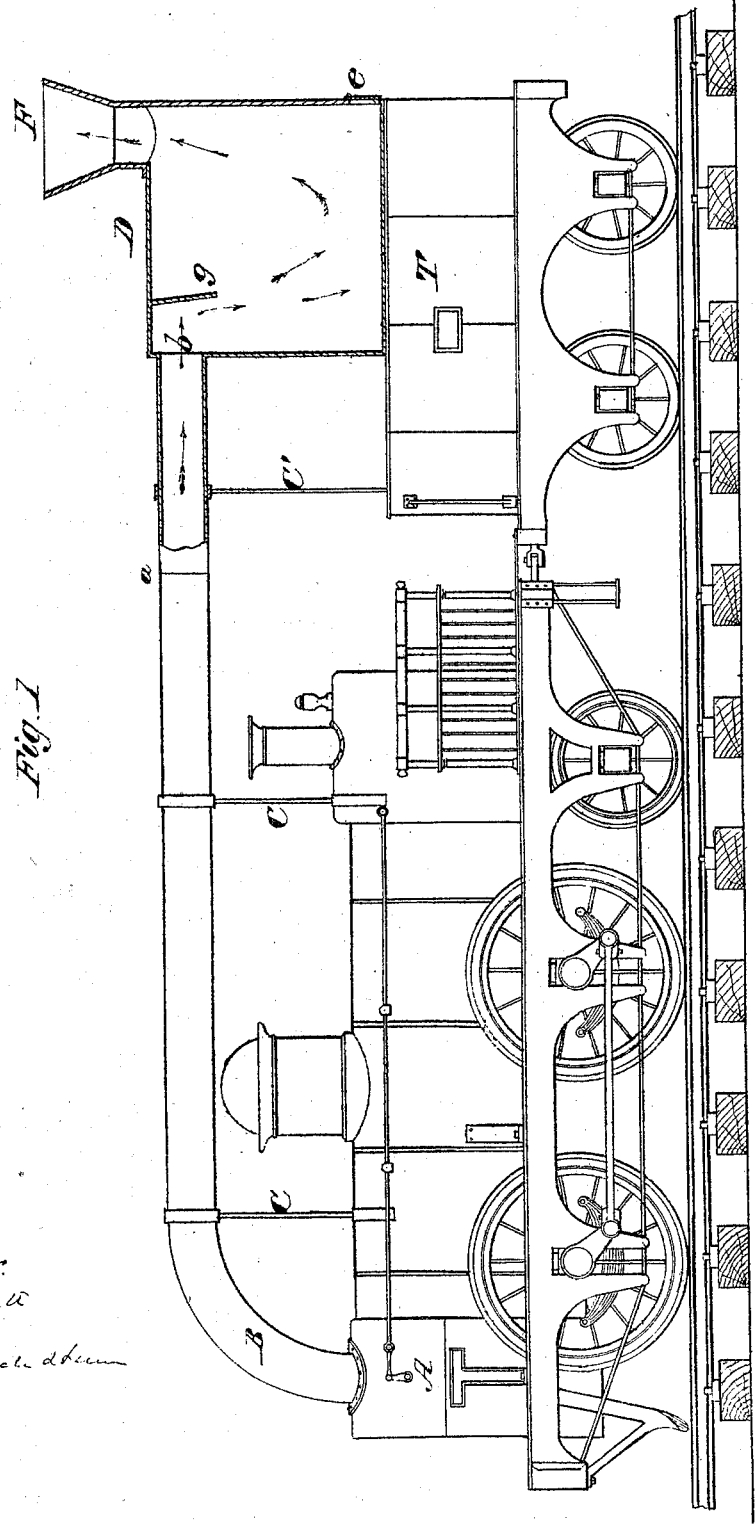

UNITED STATES PATENT OFFICE.

WILLIAM D. ARNETT, OF DENVER, COLORADO TERRITORY.

IMPROVEMENT IN SPARK-ARRESTERS FOR LOCOMOTIVES.

Specification forming part of Letters Patent No. 128,841, dated July 9, 1872.

*To all whom it may concern:*

Be it known that I, WILLIAM D. ARNETT, of Denver, in the county of Arapahoe and Territory of Colorado, have invented a new and Improved Spark-Arrester for Locomotive-Engines; and I do hereby declare that the following is a full, clear, and exact description thereof, reference being had to the accompanying drawing making part of this specification, in which—

Figure 1 is a side elevation of a locomotive and tender, showing my improved spark-arrester, partly in section.

The following description of my invention will enable others skilled in the art to understand it.

In the accompanying drawing I have represented a spark-arresting trap or receiver, D, arranged upon a locomotive-tender; but this trap may be supported upon the locomotive or upon trucks of its own. From the smoke-box A of the locomotive a pipe, B, extends backward and communicates at *b* with the interior of the trap D. This pipe B is supported upon the locomotive by means of rods C C, and upon the tender T by means of a rod, C'. This pipe B should be jointed at *a* so as to afford it all the flexibility required, and to allow the separation of the tender from the locomotive when this is necessary. The spark receiver or trap D may be rectangular or of any other desirable shape. It is provided with a smoke stack, F, a deflecting-plate, *g*, and also openings *e*, which latter are closed by means of doors or slides. The smoke-stack F will afford all the draught required for the locomotive-furnace, it being aided by the exhaust steam which escapes into the smoke-box A. The deflecting-plate *g* is arranged opposite the rear terminus of the pipe B, and directs the sparks and cinders down upon the bottom of the trap, from which they can be removed from time to time through the openings *e*. Instead of allowing the steam from the cylinders to exhaust into the smoke-box A, as is usual, the exhaust may be made directly into the receiver D.

I do not claim a spark-arrester constructed as shown in the patent granted to Charles B. Keyes June 19, 1866, nor one constructed as shown in the application of H. Fairchild, rejected September 12, 1866; but What I do claim as my invention, and desire to secure by Letters Patent, is—

The combination of the pipe B, rising from the fire-box and running back above the engine, with the water tank or box D, which has the deflector *g* near to the front of the box and directly opposite the passage of said pipe B, and has the smoke-stack arranged in rear of said plate above the said passage, all in the manner shown and described, whereby the sparks are effectually deflected into the tank and at the same time a powerful draught maintained, as set forth.

WILLIAM D. ARNETT.

Witnesses:
WM. M. B. SARELL,
EDWARD L. BERTHOUD.